United States Patent Office 2,906,748
Patented Sept. 29, 1959

2,906,748
NEW MONOAZO-DYESTUFFS

Henri Riat, Arlesheim, and Fritz Oesterlein, Basel, Switzerland, assignors to Ciba Limited, Basel, Switzerland, a Swiss firm No Drawing. Application March 3, 1958
Serial No. 718,432

Claims priority, application Switzerland March 18, 1957

5 Claims. (Cl. 260—199)

This invention provides valuable new monoazo-dyestuffs which are suitable for dyeing textile materials and correspond to the formula (1)

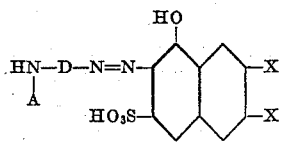

in which A represents a β-halogenated propionyl group, D represents a benzene radical, one X represents a hydrogen atom and the other X an R—CO—NH—group, in which R represents a free amino group or the radical of an aliphatic alcohol of low molecular weight bound through its oxygen atom.

The invention also provides a process for the manufacture of the monoazo-dyestuffs of the above Formula 1 wherein a coupling component of the formula (2)

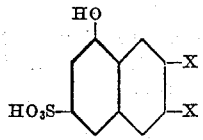

is coupled with a diazo-compound of an amine of the formula (3)         A—NH—D—NH$_2$ in which A, D and the two X's have the meaning given for Formula 1.

As coupling component of the Formula 2 there may be used 2-ureido-8-hydroxynaphthalene-6-sulfonic acid and especially 2-ureido-5-hydroxynaphthalene-7-sulfonic acid, and also 2-amino-5-hydroxynaphthalene-7-sulfonic acids of which the amino group is substituted by a carbalkoxy group of low molecular weight, for example a carbomethoxy or carbethoxy group or a group of the formula —CO—OC$_2$H$_4$—OCH$_3$.

As amines of the Formula 3 there may be mentioned more especially those which contain a sulfonic acid group in the benzene radical D, for example, 4-(β-chloropropionylamino)-2-amino-benzene-1-sulfonic acid, 5-(β-chloropropionylamino)-2-amino-benzene-1-sulfonic acid, 5-(β-bromopropionylamino)-2-amino-benzene-1 - sulfonic acid and 4-(β-bromopropionylamino)-2-amino-benzene-1 - sulfonic acid.

The coupling is advantageously carried out in an alkaline medium.

The invention also includes a modification of the process for making the dyestuffs of the Formula 1, wherein an amino-monoazo-dyestuff of the formula (4)

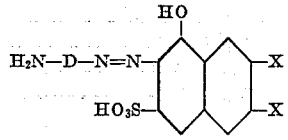

which can be obtained by the reduction of a dyestuff of the formula (5)

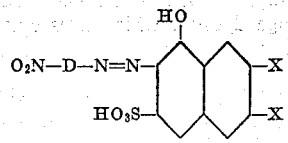

in which D and X have the meanings given above, is acylated with the anhydride or a halide of a β-halogenated propionic acid. As such halides there may be mentioned principally the chlorides of β-halogen-propionic acids, such as β-chloropropionyl chloride.

The acylation is advantageously carried out in the presence of an acid-containing agent, such as sodium acetate or sodium carbonate. It is carried out in such manner that the aliphatically bound exchangeable halogen atom is present in the acylation product obtained, for example, by working in a weakly acid to neutral medium and/or at as low a temperature as possible.

Notwithstanding the presence of a labile halogen atom in the dyestuffs of the Formula 1 they can be isolated and worked up into useful dry dyestuff preparations without losing their valuable properties. The dyestuffs are advantageously isolated at as low a temperature as possible by salting out and filtration. The filtered dyestuffs may be dried, if desired, after the addition of an extender. The drying is preferably carried out at not too high a temperature and under reduced pressure. In some cases dry preparations can be obtained by spray drying the whole mixture in which the dyestuff is prepared, that is to say, without first isolating the dyestuff.

These new dyestuffs of the Formula 1 are suitable for dyeing and printing a very wide variety of materials such as leather, silk, wool and superpolyurethane and superpolyamide fibers, especially polyhydroxylated fibrous materials, such as linen, regenerated cellulose, and above all cotton, and also synthetic fibers of viscose. They are especially suitable for dyeing polyhydroxylated materials in the presence of alkali in an aqueous bath having a strong concentration of salt. In certain cases it is desirable, in order to improve exhaustion of the bath or to obtain better fixation of the dyestuff on the fiber, to heat the dyebath towards the end of the dyeing operation to 90–100° C. The dyestuffs, after being applied by foularding, printing or direct dyeing, for example, to cellulose fibers, may be subjected for fixing the dyestuff to a heat treatment in the presence of an alkali, for example, sodium carbonate, sodium hydroxide, and alkaline earth metal hydroxide, trisodium phosphate or the like. In order to improve the properties of wet fastness it is of advantage to subject the dyeings or prints so obtained to thorough rinsing with cold and hot water, if desired, with the addition of an agent having a dispersing action and assisting diffusion of any non-fixed dyestuff.

The dyeings produced with the new dyestuffs on polyhydroxylated, especially cellulosic, fibers are generally distinguished by the purity of their tints, by their good fastness to light, and above all by their excellent fastness to washing.

The following examples illustrate the invention, the parts and percentages being by weight.

Example 1

27.8 parts of 4-(β-chloropropionylamino)-2-aminobenzene-1-sulfonic acid (obtained by the monoacylation of 2:4-diaminobenzene-1-sulfonic acid with β-chloropropionylchloride) are stirred in 200 parts of water and 25 parts of concentrated hydrochloric acid and 25 parts of a 4 N-solution of sodium nitrite are added. When the diazotization is finished, the mixture is neutralized with 20 parts of sodium carbonate solution of 15% strength. The diazo-compound is run into an ice-cold solution of 28.2 parts of 6-ureido-1-naphthol-3-sulfonic acid and 20 parts of sodium bicarbonate in 400 parts of water. When the coupling is finished, the partially precipiated dyestuff is completely salted out by the addition of sodium chloride, filtered off and dried in vacuo at 50–60° C. There is obtained an orange dyestuff which dyes cotton by the process described in Example 5 orange tints that are fast to washing.

A dyestuff having very similar properties is obtained by using, instead of 4-($\beta$-chloropropionylamino)-2-aminobenzene-1-sulfonic acid, the equivalent quantity of 4-($\beta$-bromopropionylamino)-2-aminobenzene-1-sulfonic acid.

By using, instead of 6-ureido-1-naphthol-3-sulfonic acid, 7-ureido-1-naphthol-3-sulfonic acid, there is obtained a dyestuff which dyes cotton yellowish red tints.

*Example 2*

27.8 parts of 5-($\beta$-chloropropionylamino)-2-aminobenzene-1-sulfonic acid are diazotized in 200 parts of water and 20 parts of hydrochloric acid with 6.9 parts of sodium nitrite. The diazo-compound is neutralized with sodium bicarbonate and coupled with a cold solution of 6-ureido-1-naphthol-3-sulfonic acid and 20 parts of sodium bicarbonate. When the coupling is finished the dyestuff is salted out, filtered off and dried. It dyes cotton pure scarlet tints having very good properties of wet fastness. It dyes wool from a weakly acetic acid bath pure scarlet tints.

By using, instead of 6-ureido-1-naphthol-3-sulfonic acid, the equivalent quantity of 7-ureido-1-naphthol-3-sulfonic acid, there is obtained a dyestuff which dyes cotton red tints.

*Example 3*

27.8 parts of 5-($\beta$-chloropropionylamino)-2-aminobenzene-1-sulfonic acid are diazotized in 200 parts of water and 20 parts of concentrated hydrochloric acid with 6.9 parts of sodium nitrite. The diazo-compound is coupled with a solution of 32.1 parts of 2-carbethoxy-amino-5-hydroxynaphthalene-7-sulfonic acid rendered alkaline with sodium bicarbonate. When the coupling is finished the dyestuff is salted out, filtered off and dried. It dyes cotton fast pure scarlet tints.

A dystuff having similar properties is obtained by using, instead of 2-carbethoxyamino-5-hydroxynaphthalene - 7-sulfonic acid, 2-carbomethoxy-amino-5-hydroxynaphthalene-7-sulfonic acid, or the 2-carbethoxy-amino-5-hydroxynaphthalene-7-sulfonic acid whose ethoxy group bears a methoxy substituent in $\beta$-position.

*Example 4*

20 parts of the amino-azo-dyestuff of the formula

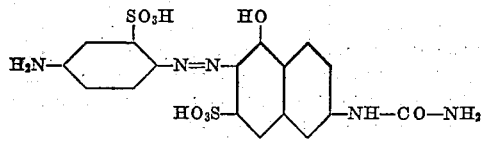

(obtained by coupling diazotized 5-nitro-2-amino-benzene-1-sulfonic acid with 6-ureido-1-hydroxynaphthalene-3-sulfonic acid followed by reduction of the nitro group to the amino group) are dissolved in 500 parts of water and neutralized with sodium carbonate. There are then slowly added 20 parts of $\beta$-bromoproprionyl chloride, and the reaction mixture is neutralized by the addition of a dilute solution of sodium hydroxide. The dyestuff is isolated by salting out, filtration and drying in the usual manner, and dyes cotton pure scarlet tints.

*Example 5*

2 parts of the dyestuff obtained as described in the first paragraph of Example 1 are dissolved in 100 parts of water. The cotton fabric is impregnated with the resulting solution on a foulard and the fabric is squeezed to remove the excess liquid and retain on the material 75% of its weight of dyestuff solution. The material so impregnated is dried, and then impregnated at room temperature in a solution containing, per liter, 10 grams of sodium hydroxide and 300 grams of sodium chloride, then squeezed to a weight increase of 75% and steamed for 60 seconds at 100–101° C. The material is then rinsed, treated in a sodium bicarbonate solution of 0.5% strentgh, rinsed, soaked for a quarter of an hour in a solution of 0.3% strength of a non-ionic detergent at the boil, then rinsed and dried. There is obtained a pure orange dyeing which is fixed fast to boiling.

What is claimed is:

1. A monoazo-dyestuff which in its free acid state corresponds to the formula

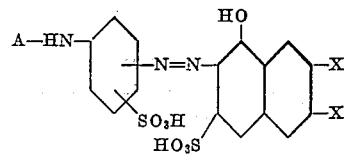

wherein A represents a $\beta$-halogenated propionyl radical, one of the two X's a hydrogen atom and the other a substituent R—CO—NH— in which R represents a member selected from the group consisting of the amino group and the radical of a lower aliphatic alcohol bound by its oxygen atom to the adjacent —CO—.

2. A monoazo-dyestuff which in its free acid state corresponds to the formula

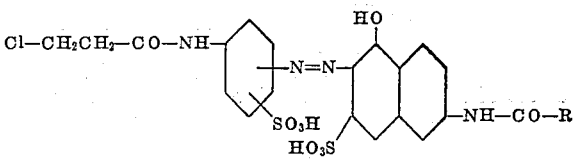

wherein R represents a lower alkoxy group.

3. A monoazo-dyestuff which in its free acid state corresponds to the formula

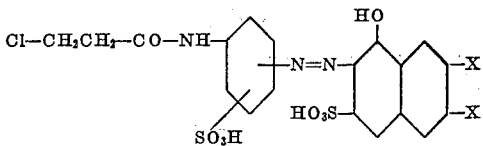

wherein one X is hydrogen and the other X a substituent of the formula —NH—CO—NH$_2$.

4. The monoazo-dyestuff which in its free acid state corresponds to the formula

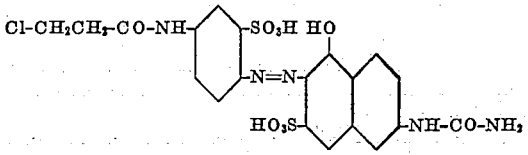

5. The monoazo-dyestuff which in its free acid state corresponds to the formula

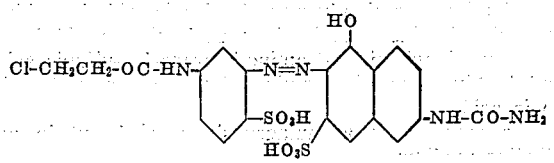

References Cited in the file of this patent

UNITED STATES PATENTS

| | | |
|---|---|---|
| 1,731,643 | Wagner et al. | Oct. 15, 1929 |
| 2,384,750 | Knight et al. | Sept. 11, 1945 |
| 2,384,752 | Knight et al. | Sept. 11, 1945 |
| 2,384,753 | Knight | Sept. 11, 1945 |